United States Patent Office 3,282,426
Patented Nov. 1, 1966

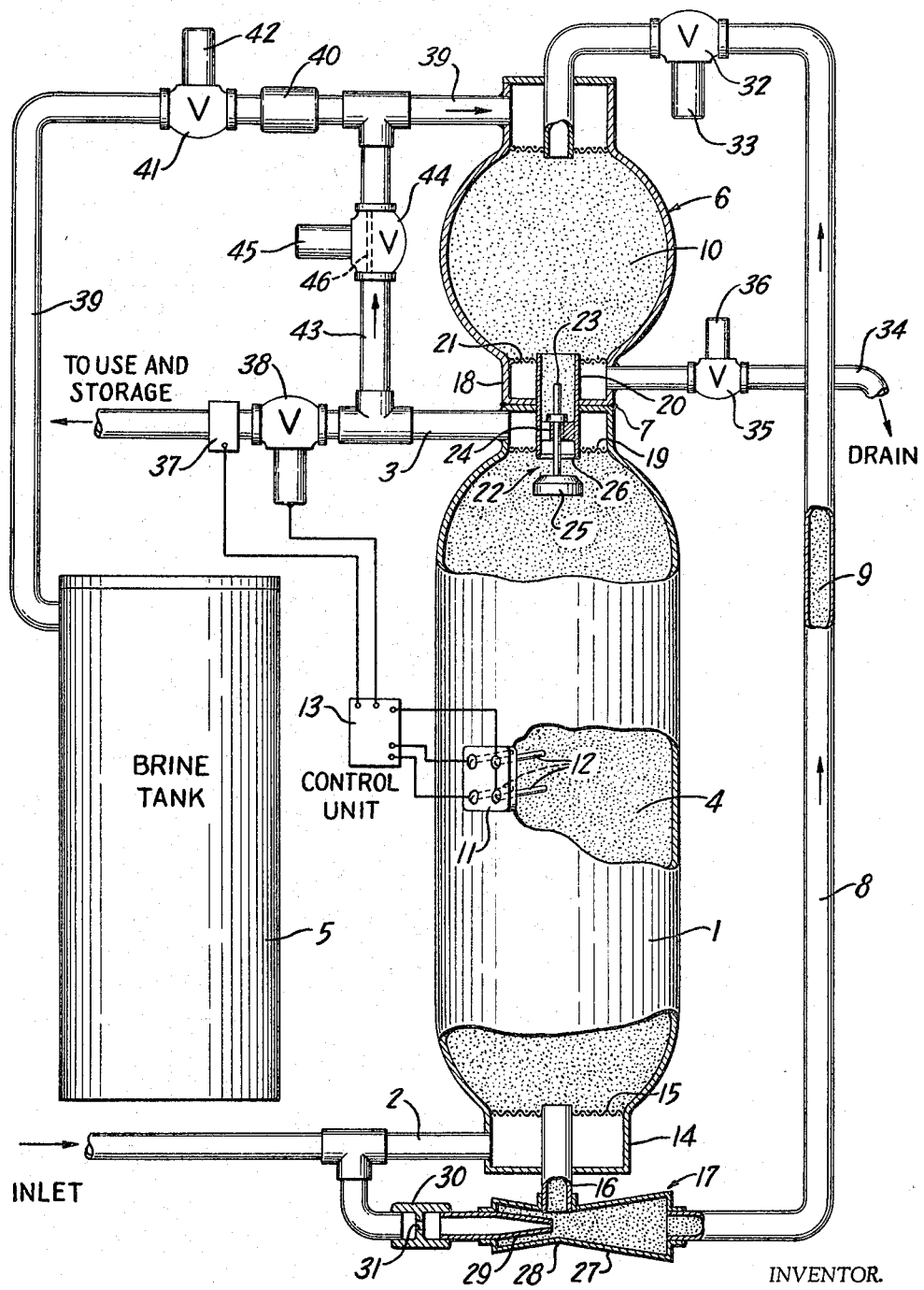

3,282,426
ION EXCHANGE SYSTEM
James S. Entringer, Elm Grove, Wis., assignor, by mesne assignments, to Culligan, Inc., North Brook, Ill., a corporation of Delaware
Filed Dec. 23, 1963, Ser. No. 332,562
9 Claims. (Cl. 210—96)

This invention relates to an ion exchange system and particularly to a water softening system for removing hardness causing ions from water.

Water softening apparatus normally employs a granular bed of an ion exchange carrier such as zeolite or a resin with the bed housed in a suitable softener tank. The bed is saturated with sodium ions normally through the periodic immersion in a salt brine solution. As the incoming hard water flows through the bed, the hardness forming ions such as calcium and magnesium are exchanged for the sodium ions and the water discharged is more or less soft depending upon the degree of ion exchange within the bed. After periods of softening, the sodium ions in the exchange bed are exhausted and consequently the bed is no longer effective and must be recharged or regenerated.

The bed is most commonly periodically regenerated within the softener tank by disconnecting of the tank from the supply system and interconnecting it in a regenerating system wherein the bed is subjected to a brine solution for a predetermined period and subsequently washed with fresh water to remove excess brine from the tank. The softener tank is again reconnected into the system. It has also been suggested that a continuous regeneration of a portion of the bed be provided by withdrawing of the bed from within the tank and transferring it to a separate regeneration tank with a subsequent return of the material to the tank. This system has the distinct advantage of permitting continuous connection of the softening tank in the water supply system to continuously provide soft water to the consumer. This system depends, however, on operating of the bed of ion exchange material such that exhaustion occurs progressively from the incoming end of the bed to the discharge end of the bed, in order to permit withdrawal of the exhausted resin while maintaining charged or regenerated resins still in the bed.

It has been found advantageous in automatic regenerating systems to employ a detection system which directly determines the regenerating state of the bed by insertion of probes directly in the bed, as disclosed and claimed in the copending application of Morris A. Matalon entitled Regeneration Control for Ion Exchange Beds, Serial No. 274,374 which was filed on April 5, 1963, now Patent No. 3,246,759, and is assigned to a common assignee with the present application. As also disclosed therein, the bed is advantageously removed from the lower end of the tank and transferred to the regeneration tank through a suitable hydraulic system. However, this requires a counterflow system of softening wherein the hard water is introduced into the lower portion of the tank and flows upwardly through the tank. The upwardly flowing water tends to lift the bed with a resulting intermixing of the exhausted and charged resin. Consequently, the distinct progressive exhaustion of the bed is interfered with and the optimum layer type control does not result for permitting removal of exhausted resin while maintaining a portion of fully charged resin in the softener.

The present invention is particularly directed to a counterflow type continuous softener wherein a fixed bed position is maintained and positively prevents intermixing of the exhausted and unexhausted portions of the bed while permitting the partial removal of an exhausted portion. In accordance with the present invention, a closed resin path is provided between the softener and a regeneration chamber by suitable interconnecting conduit or passageway means. An ion exchange carrier completely fills the softener, the regeneration chamber and the interconnecting resin carrier transfer means. The bed is thus positively locked as a fixed member within the softener tank. When a portion of the bed is exhausted, and the regeneration cycle is triggered, a portion of the bed is removed from the softener tank and transferred into the regeneration chamber. Simultaneously and progressively with the transfer from the tank to the regeneration chamber, a fully charged or regenerated carrier is transferred from the regeneration chamber into the tank to maintain a completely filled resin system. As a result, the apparatus prevents any appreciable intermixing of the ion exchange carrier bed and maintains very accurate, highly reliable progressive exhaustion throughout the bed. This system is therefore particularly adapted to employment of a regeneration signalling control employing probes embedded directly in the bed to determine the character of bed activity and to provide for automatic regeneration in accordance with said detection.

The drawing furnished herewith illustrates the best mode presently contemplated for carrying out the invention and disclosing the various advantages and objects of the present invention.

The drawing is a diagrammatic illustration of a water treating system constructed in accordance with the present invention.

Referring to the drawing, a water softening chamber or tank 1 is illustrated having a lower inlet conduit 2 secured to the bottom portion of the tank 1 and a top outlet or service conduit 3 secured to the upper portion of the tank 1. A bed 4 of an ion exchange zeolite, resin or other granular material completely fills the tank 1. Water in flowing upwardly through the tank 1 and the bed 4 gives up hardness forming ions to the bed in exchange for softening ions in accordance with the known softening process.

A brine tank 5 is connected to a regeneration tank or chamber 6 which is mounted on the very top of a tank 1 and connected thereto as by a weld 7. A resin transfer tube 8 is connected at one end to the bottom of the tank 1 and at the opposite end to the top of the regeneration chamber 6. An ion exchange resin 9 completely fills the transfer conduit 8 and a similar ion exchange resin 10 completely fills the regeneration chamber 6 and with the resin filled tank 1 creates a completely filled recirculating resin system having a softening portion or section and a regenerating portion or section.

In operation, whenever a portion of resin 4 is exhausted, the resin is circulated from the tank 1 to the chamber 6 with a corresponding portion of regenerated resin 10 from chamber 6 being transferred into the tank 1. As a result, the several portions of resin within the bed 4 are always fixed in relation to each other and cannot intermix within the tank 1.

In order to determine when a regeneration is necessary, a probe detection unit 11 is secured to the central portion of the tank 1 with suitable probes 12 projecting into the bed 4. The probes 12 are interconnected with a regeneration control unit 13 which in turn is connected to various timers and valves. The probe unit 11 determines directly the status of adjacent portions of the bed 4. When the lower portion of the bed 4 is exhausted as sensed by probes 12, the regeneration control unit 13 is actuated to establish a regeneration cycle in which a lower portion of the resin 4 is removed and a similar portion is simultaneously added within the top of the tank such that charged resin is maintained in tank 1 at all times. Control unit 13 also automatically regenerates the resin transferred into the chamber 6.

More particularly, the illustrated embodiment of a softening tank 1 includes a lower reduced neck portion 14 depending downwardly as an integral portion of the tank. The bottom inlet conduit 2 is secured to the wall of the neck portion 14 and to the incoming water system, not shown. A supporting screen 15 spans the junction of the tank bottom and the lower neck portion 14 to support the resin 4 within the tank 1. The openings in the screen 15 allow ready movement of water upwardly through the bed 4 but prevent resin 4 from falling into portion 14 and the conduit 2. A resin transfer tube 16 is concentrically secured within the lower neck portion 14 and projects vertically downwardly through the screen 15 into a connection with the lower end of the transfer tube 8 by a venturi unit 17 for transferring of the resin 4 from the tank 1, as hereinafter described.

The upper end of the tank 1 and the lower end of chamber 6 are similarly formed with aligned neck portions 18 interconnected by weld 7. The soft water outlet or service conduit 3 is connected to the neck portion 18 of tank 1. A screen 19 is secured to the junction of the tank 1 and the neck portion 18 to provide a locking upper surface for the resin 4 while permitting free flow of water to the service conduit 3. A resin transfer tube 20 is similarly coaxially secured within the neck portion 18 and extends from just inwardly of the screen 19 upwardly into the regeneration chamber 6 and through a screen 21 spanning the upper end of neck portion 18 within chamber 16. A check valve 22 is slidably mounted within the transfer tube 20 and is adapted to selective open and close the lower end of the tube in accordance with a differential pressure operation. The illustrated check valve 22 includes a stem 23 slidably disposed within a journal or bearing 24 mounted or secured to the inner wall of the transfer tube 20. A check valve closure member or plate 25 is secured to the lower end of the stem 23 and has an upper chamfered edge corresponding to a chamfered or flared seat 26 provided on the lower end of the tube 20. Normally, the incoming water pressure established in the tank 1 will hold the check valve 22 in the closed position, that is with the closure plate 25 seated on the seat 26 to prevent movement of resin from the regeneration chamber 6 into the tank 1. When the pressure across the check valve 21 is equalized, gravity causes the plate 25 to move downwardly and open the passageway between chamber 6 and tank 1. Valve 22 is opened as hereinafter described in response to establishment of a regeneration cycle for circulation of a selected volume of resin between tank 1 and the regeneration chamber 6.

The venturi unit 17 which interconnects the transfer tube 16 and the transfer tube 8 includes a venturi housing 27 with a reduced throat section 28 connected to the lower end of the tube 16. One end of the venturi housing 27 is connected to tube 8. A jet 29 is secured within the opposite end of the venturi housing 27 and connected to the hard water inlet conduit 2 in series with a flow rate control unit 30.

The flow control unit 30 is shown having a small flow control orifice 31 therein. The size of the orifice 31 will determine the flow through the venturi jet 29 for any given incoming pressure and therefore determine the suction at the throat 28 for transfer of the resin from tube 16 into tube 8 and up to the top portion of the regeneration chamber 6 in accordance with known venturi action.

A resin transfer control solenoid valve 32 is provided in the tube 8 and normally holds the tube closed to prevent flow through the venturi unit 17. A control winding or solenoid 33 is associated with the valve 32 and connected to the control 13 for automatic or manual opening.

The illustrated regeneration chamber 6 is shown as a spherical member having the bottom neck portion 18 connected to the corresponding portion 18 of tank 1. A drain line 34 is secured to the neck portion 18 of chamber 6 between the screen 21 and the bottom wall of chamber 6. A drain valve 35 is mounted in the line 34 and controlled by a solenoid 36 which in turn is connected for energization through the control 13.

The triggering of the regeneration cycle is established by the probe unit 11 actuating or triggering control unit 13. The operation of probe unit 11 is more fully set forth in the previously referred to patent of Morris A. Matalon but generally functions in the following manner. The bed 4 is exhausted beginning at the lower end and then progressively upwardly therefrom in the direction of the flow of the water. There is therefore a more or less distinct inner layer in which the exchange process takes place. As this operational layer moves past the probe unit 11, the resistance of bed 4 as sensed by probes 12 changes and creates a triggering signal to the regeneration control 13 to establish a regeneration cycle. The control unit 13 actuates valve solenoids 33 and 36 to simultaneously move a portion of the resin 4 from the tank 1 into the tube 8 and a similar amount or portion of resin 10 from the chamber 6 into the tank 1.

When the resin transfer solenoid valve 32 is energized, it opens and equalizes the pressure across the check valve 22. The check valve 22 then opens to allow transfer of resin 10 from regeneration chamber 6 to the tank 1. There is no transfer at this time however, as the complete system is filled with resin.

When the drain valve 35 however is actuated and opened, water begins to flow through the flow control unit 30 and venturi unit 17. The venturi action causes the resin 4 in tank 1 to flow therefrom through the connecting tube 8 to the regeneration chamber 6. Simultaneously, previously regenerated resin 10 in chamber 6 falls through the resin transfer tube 20 onto the resin 4. Thus, resin 10 is added to the descending column of resin 4 in tank 1 to maintain the tank 1 completely filled at all times. When the exhausted resin has been removed from the tank 1, the resin transfer solenoid valve 32 is de-energized and closes. As a result, the pressure in the tank 1 again closes the check valve 22. Any flow through the small opening provided by the check valve 22 after closing of valve 32 results in a small pressure drop with a lower pressure created in chamber 6. The closure plate 25 is therefore forced upwardly into sealing engagement with the seat 26 on the lower end of tube 20 and reconnects the softening portion defined by tank 1 into the normal service or supply system.

During the period that the resin is being transferred from and to the tank 1, service water flow through the tank 1 should be avoided. Consequently, satisfactory operation can be practically insured by having a signal from the probe unit 11 stored or delayed if flow exists through the tank 1. For example, a flow switch 37 can be provided in the outlet conduit 3 and connected to control unit 13. Alternately, a valve 38 may be provided in the main service line or conduit 3 and actuated in synchronism with transfer valve 32 to prevent normal service during the resin transfer. The transfer will normally be made very rapidly such that only a short period of disconnect is required.

When the resin transfer solenoid 32 closes, the tank 1 is thus inserted back into the service line in the same condition as that established prior to the regeneration signal. The exhausted resin 10 now in the chamber 6 may then be regenerated in the following manner.

A brine line 39 connects the brine tank 5 to the upper end of the chamber 6. A flow control unit 40 similar to unit 30 is inserted in the brine line 39 to control the flow rate of brine from the tank 5 into chamber 6 during the regenerating cycle. A brine valve 41 is interposed between the flow control unit 40 and the tank 5 for selective opening and closing of the line. A solenoid 42 is connected to control unit 13 for proper timed actuation of valve 41.

A rinse line 43 is interconnected at one end to the soft water outlet or service conduit 3 and at the opposite end to the brine line 41 following the unit 40. The rinse line 43 is held normally closed by a solenoid actuated rinse control valve 44 having an operating solenoid 45. A small bleed or bypass orifice 46 is formed in the valve 44 to provide a small continuous flow through valve 44 during a regeneration cycle for diluting the brine and providing a slow rinse action. Valve 44 is opened to produce a final fast rinse.

The operation of the illustrated embodiment of the invention is summarized as follows.

The regeneration control 13 establishes an automatic transfer of a signal to solenoids 33 and 35 in response to a triggering signal from the probe unit 11 or may actuate an indicator, not shown, which would show the necessity for a manually controlled regeneration.

The resin 4 is transferred from tank 1 to the chamber 6 and a corresponding quantity is transferred from chamber 6 to the tank 1 by the opening of valves 32 and 36, as previously described. The main transfer valve 32 is then closed and check valve 22 closes. Control unit 13 then energizes solenoid 42 and the brine valve 41 opens. The brine solution, diluted by the small quantity of water from line 3 as passed by passageway 46 in valve 44, flows through the regeneration chamber 6 and resin 10. The spent brine is discharged through the drain line 34 to a sewer or other waste system. After predetermined brining time, the brine valve 41 is closed by de-energizing of the solenoid 42. The solenoid 45 is then energized and rinse valve 44 opens to provide a fast fresh water rinse of the resin 10 for a selected period. At the end of this time, the drain valve 35 and the rinse valve 44 are closed to return the complete system to the original softening state pending a further signal from the probe unit 11 at which time a similar regeneration cycle is established to transfer a second portion of resin 4 to chamber 6 and return the resin 10 to tank 1.

The present invention establishes a fixed resin bed which essentially eliminates intermixing of the resin with a consequent destruction of the progressive layer type exhaustion of the bed. This also insures highly reliable and accurate regeneration control by the probe sensing unit or the like.

The present invention has been found to provide highly satisfactory results with a capacity for continuous softening of water having a substantial hardness and a relatively small quantity of ion exchange material. A unit containing only one third of a cubic foot of cation exchange resin has been found to satisfactorily soften water containing an influent hardness as high as 100 grains per gallon with a flow rate of five gallons per minute per square foot of cross sectional area of the softener tank 1. The present invention thus provides a continuous softener having periodic partial regeneration of the bed, while maintaining at least a partial fully charged ion exchange resin or other carrier within the softening chamber.

Various modes of carrying out the invention are contemplated as being within the scope of the following claims particularly pointing out and distinctly claiming the subject matter which is regarded as the invention.

I claim:
1. In a water softening system,
(a) a softening chamber having a bottom inlet line and a top output line for connection in a pressurized water system and containing an ion exchange material adapted to be regenerated by immersion in a regenerating solution,
(b) a regeneration chamber mounted to the top of the softening chamber and having a common conduit interconnecting the regeneration chamber to the upper end of the softening chamber,
(c) a valve member slidably disposed within the common conduit with a valve closure member and gravity biased to open position, the relative pressure of said two chambers selectively urging the closure member into engagement with the common conduit to close the opening therebetween,
(d) a transfer tube secured to the bottom of the softening chamber and extending downwardly therefrom,
(e) a venturi having a throat connection connected to the lower end of said transfer tube and having an input jet connected to the bottom inlet line and having a venturi outlet,
(f) a transfer conduit connected to the outlet of said venturi and terminating in the upper end of the regenerating chamber,
(g) a main transfer valve normally closing said transfer conduit,
(h) a drain line in said regeneration chamber secured to the lower portion thereof,
(i) a normally closed valve in the drain line,
(j) means to open the main transfer valve and equalize the pressure across said check valve thereby opening the check valve,
(k) means to open the drain valve to allow flow from the venturi through the transfer conduit and the regeneration chamber to thereby draw a quantity of resin from the lower end of the bed and force it through the transfer conduit upwardly to the regeneration chamber and to simultaneously transfer resin from the regeneration chamber to the check valve into the softening chamber,
(l) a regenerating solution tank,
(m) a regenerant line connected to the regeneration chamber and to the regenerating solution tank,
(n) a normally closed valve means in the regenerant line, and
(o) regeneration means adapted to open the last mentioned valve means while maintaining the drain valve open and thereby passing a regenerating solution through the resin in the regeneration chamber.

2. In a fixed bed water softener,
(a) a softening tank having a top and bottom opening and an inlet means at one end,
(b) an upper and a lower transfer tube extending respectively from the openings,
(c) a check valve mounted in the upper transfer tube and gravity biased to the open position and adapted to move upwardly into sealing engagement with the transfer tube under tank pressure,
(d) a regeneration chamber having an upper and a bottom opening,
(e) means securing the chamber to the softening tank with the upper transfer tube projecting into the chamber,
(f) a hydraulically actuated means connected to the inlet means end of the tank and to the lower transfer tube,
(g) a main transfer conduit connected to the hydraulically actuated means and to the upper opening of the regeneration chamber,
(h) a transfer valve in the main transfer conduit for selectively opening and closing the same,
(i) a drain line connected to the regeneration chamber,
(j) a drain valve in said drain line for selectively opening and closing the same,
(k) a brine line from a source of brine solution connected to the regeneration chamber,
(l) a brine valve in said brine line to selectively open and close the same,
(m) a rinse line interconnecting the top opening of the softening tank to the upper opening of the regeneration chamber,
(n) a rinse valve in said rinse line for selectively opening and closing the same.
(o) a flowable ion exchange carrier completely filling said tank and chamber and said transfer tubes whereby movement of resin from the bottom of the tank is accompanied by a simultaneous and corresponding movement of resin into the top of the tank, and (p) means for actuating said valves to sequentially transfer resin to the regeneration chamber, seal the chamber from the tank, pass a brine solution through the regeneration chamber and pass a rinse solution through the regeneration chamber and then seal the regeneration chamber.

3. In a fixed bed water softener,
(a) a softening tank having an upper and a lower tubular neck, a hard water inlet connected to the lower neck and a soft water outlet connected to the upper neck,
(b) screen means secured spanning the tubular necks at the junctions to the tank,
(c) an upper and a lower transfer tube extending respectively through said necks,
(d) a check valve mounted in the upper transfer tube and biased by pressure in the tank into sealing engagement with the transfer tube,
(e) a regeneration chamber having an upper and a lower neck,
(f) screen means secured spanning the tubular necks at the junction to the chamber,
(g) means securing the lower neck of the chamber to the upper neck of the softening tank with the upper transfer tube projecting therethrough and terminating through the screen,
(h) a venturi having a throat connected to the lower transfer tube and an inlet jet connected to the hard water inlet of the tank and an outlet,
(i) a main transfer conduit connected to the outlet of the venturi and extended through the upper neck of the regeneration chamber,
(j) a transfer valve in the main transfer conduit for selective opening and closing the same,
(k) a drain line connected to the lower neck of the regeneration chamber,
(l) a drain valve in said drain line for selectively opening and closing the same,
(m) a brine line connected to the upper neck of the regeneration chamber,
(n) a brine valve in said brine line to selectively open and close the same,
(o) a rinse line interconnecting said brine line to the soft water outlet of the softening tank,
(p) a rinse valve in said rinse line for selectively opening and closing the same, and
(q) a granular softening ion exchange resin completely filling said tank and chamber between said corresponding screens and said transfer tubes and main transfer conduit whereby movement of resin from the bottom of the tank is accompanied by a simultaneous and corresponding movement of resin into the top of the tank.

4. In a fixed bed softener according to claim 3, having
(a) probe means centrally embedded within the resin in the softening tank for establishing a regeneration control signal, and
(b) regeneration control means actuated by said probe means in response to predetermined depletion of the resin in the central portion of the softening tank.

5. A water softening system comprising,
(a) a recirculating resin system including a softener tank, a regeneration tank mounted on top of the softener tank and a transfer conduit connecting the bottom of the softener to the top of the regeneration tank,
(b) a transfer tube connecting the bottom of the regeneration tank with the top of the softener tank,
(c) an ion exchange resin completely filling said system whereby movement in any portion thereof is accompanied by a similar movement in other portions, (d) a check valve in the transfer tube controlling movement of the resin downward therethrough,
(e) a drainline connected to the regeneration tank,
(f) a valve means in the transfer conduit for selective opening and closing of the transfer conduit,
(g) a venturi section connecting the lower end of the softener tank to the transfer conduit, and
(h) control means connected with said softener tank for selective actuation of said valve means.

6. A water softening system having a circulating resin path, comprising
(a) a water softener tank having a softening resin bed effecting softening of hard water passing therethrough and an inlet for hard water,
(b) a regeneration chamber,
(c) a resin transfer conduit communicating between the bottom of the softener tank and the top of the regeneration chamber for transferring at least a portion of the softening resin from the softener tank to the regeneration chamber, said conduit including a valve means,
(d) means interconnecting the bottom of the regeneration chamber with the top of the softener tank for transferring the resin from said chamber to the softener tank,
(e) an ion exchange resin filling said regeneration chamber and the interconnecting conduits,
(f) a venturi connected in said resin transfer conduit having a throat section connected to withdraw resin from said softener tank and an inlet connected to the hard water inlet,
(g) a flow rate control means interposed between said hard water inlet and said venturi,
(h) probe means projected into the central portion of the softener tank to indicate the electrical character of the resin therein, and
(i) control means connected to said probe means to selectively operate said valve means to open and close the transfer conduit to effect a predetermined transfer of resin through the circulating resin path.

7. A water softening system having a circulating resin path, comprising
(a) a water softening tank having an inlet for hard water at the bottom and an outlet for softened water at the top thereof,
(b) a regenerating chamber connected by first passageway means in communication with the top of the softening tank and second passageway means in communication with the bottom of the softening tank and defining a closed resin circulating path,
(c) drain means connected to the bottom of the regenerating chamber,
(d) valve means in said drain means,
(e) an ion exchange granular medium filling said softening tank, said regenerating chamber and the interconnecting passageway means,
(f) first valve means for selectively opening and closing said first passageway means, and second valve means for opening and closing said second passageway means,
(g) a venturi having an input jet connected to the hard water inlet, a throat connection to the softening tank and an outlet connected to said second passageway means operable in response to opening of said second passageway means and said drain valve means to circulate the resin through the circulating path in a direction moving the exhausted resin from the softening tank to the regenerating chamber,
(h) a regenerating solution tank connected by a regenerant line to the top of the regenerating chamber to supply regenerating solution to and through the resin in the regenerating chamber and out the drain means when both passageway means are closed.

8. The system of claim 7 having
(a) said regeneration chamber mounted on top of the softening tanks,
(b) said first valve means including a check valve in said first passageway means and being biased to open the passageway and closed by the pressure in the softening tank when said second valve means is closed.

9. The system of claim 7 having,
(a) a rinse line communicating between the softened water outlet and the regenerant line, and
(b) a rinse control valve in said rinse line,
(c) said rinse control valve having a by-pass orifice allowing a limited water supply to mix with said regenerating solution when said rinse control valve is closed.

References Cited by the Examiner

UNITED STATES PATENTS

| | | | |
|---|---|---|---|
| 594,637 | 11/1897 | Manning | 210—189 X |
| 1,620,431 | 3/1927 | Bramwell | 210—189 |
| 1,722,938 | 7/1929 | Nordell | 210—189 X |
| 1,763,783 | 6/1930 | Hodkinson | 210—189 X |
| 2,468,791 | 5/1949 | Thomson | 210—96 X |
| 2,767,140 | 10/1956 | Fitch | 210—189 X |
| 2,852,464 | 9/1958 | Nordell | 210—189 X |
| 3,152,072 | 10/1964 | Yomiyama et al. | 210—189 X |
| 3,172,037 | 3/1965 | Pfeiffer | 210—30 X |
| 3,200,067 | 8/1965 | Levendusky | 210—189 X |
| 3,220,552 | 11/1965 | Staats | 210—96 |

REUBEN FRIEDMAN, *Primary Examiner.*

D. M. RIESS, *Assistant Examiner.*